(12) United States Patent
Furukawa et al.

(10) Patent No.: US 11,017,245 B2
(45) Date of Patent: May 25, 2021

(54) PARKING ASSIST APPARATUS

(71) Applicant: AISIN SEIKI KABUSHIKI KAISHA, Kariya (JP)

(72) Inventors: Masaki Furukawa, Kariya (JP); Keisuke Nose, Kariya (JP); Ryuichi Matsuda, Kariya (JP)

(73) Assignee: AISIN SEIKI KABUSHIKI KAISHA, Kariya (JP)

( * ) Notice: Subject to any disclaimer, the term of this patent is extended or adjusted under 35 U.S.C. 154(b) by 48 days.

(21) Appl. No.: 16/607,162

(22) PCT Filed: Feb. 23, 2018

(86) PCT No.: PCT/JP2018/006796
§ 371 (c)(1),
(2) Date: Oct. 22, 2019

(87) PCT Pub. No.: WO2018/198512
PCT Pub. Date: Nov. 1, 2018

(65) Prior Publication Data
US 2020/0380275 A1    Dec. 3, 2020

(30) Foreign Application Priority Data

Apr. 24, 2017   (JP) .............................. JP2017-085627

(51) Int. Cl.
*G06K 9/00* (2006.01)
*G06K 9/20* (2006.01)
(Continued)

(52) U.S. Cl.
CPC ..... *G06K 9/00812* (2013.01); *G06K 9/00798* (2013.01); *G06K 9/2063* (2013.01); *G06K 9/4604* (2013.01); *G06T 7/60* (2013.01)

(58) Field of Classification Search
None
See application file for complete search history.

(56) References Cited

U.S. PATENT DOCUMENTS

2009/0303080 A1*  12/2009  Kadowaki .......... B62D 15/0275
                                                340/932.2
2014/0244070 A1*  8/2014  Inagaki .............. B62D 15/0285
                                                701/1
(Continued)

FOREIGN PATENT DOCUMENTS

JP          2014-106706 A      6/2014

OTHER PUBLICATIONS

International Search Report for PCT/JP2018/006796 dated, May 22, 2018 (PCT/ISA/210).

*Primary Examiner* — Fayyaz Alam
(74) *Attorney, Agent, or Firm* — Sughrue Mion, PLLC

(57) ABSTRACT

A parking assist apparatus includes: a setting unit that sets, within a captured image in which objects surrounding a moving vehicle have been imaged, a first search area for searching for a pair of partition lines disposed between parking spaces that are adjacent to each other; and a detecting unit that searches the first search area to detect a first partition line out of the pair of partition lines. When the detecting unit detects the first partition line, the setting unit sets a second search area for searching for a second partition line out of the pair of partition lines on the basis of the first partition line.

5 Claims, 8 Drawing Sheets

(51) Int. Cl.
*G06K 9/46* (2006.01)
*G06T 7/60* (2017.01)

(56) References Cited

U.S. PATENT DOCUMENTS

| | | | |
|---|---|---|---|
| 2015/0254981 A1* | 9/2015 | Tachibana | G06K 9/00812 340/932.2 |
| 2015/0258988 A1* | 9/2015 | Morimoto | B60W 30/143 701/70 |
| 2018/0095474 A1* | 4/2018 | Batur | G01S 19/48 |
| 2018/0308358 A1* | 10/2018 | Hayakawa | G01C 21/26 |

* cited by examiner

PARKING ASSIST APPARATUS

CROSS REFERENCE TO RELATED APPLICATIONS

This application is national stage application of International Application No. PCT/JP2018/006796, filed Feb. 23, 2018, which designates the United States, incorporated herein by reference, and which claims the benefit of priority from Japanese Patent Application No. 2017-085627, filed Apr. 24, 2017, the entire contents of which are incorporated herein by reference.

TECHNICAL FIELD

The present invention relates to a parking assist apparatus.

BACKGROUND ART

Conventionally, a parking assist apparatus that assists in parking for a vehicle in, for example, a parking lot is known. A parking assist apparatus assists parking by detecting from a captured image a pair of partition lines provided between parking spaces for vehicles. To detect the pair of partition lines, the parking assist apparatus searches an entire area within the captured image to detect the partition lines.

CITATION LIST

Patent Literature

Patent Document 1: Japanese Laid-open Patent Application No. 2014-106706

SUMMARY OF INVENTION

Problem to be Solved by the Invention

However, in the parking assist apparatus described above, because of searching the entire area of the captured image, there has been a drawback in that time required to search for the pair of partition lines is long.

The present invention has been made in view of the above and provides a parking assist apparatus that can shorten time required for searching for a pair of partition lines.

Means for Solving Problem

In order to overcome the above-described drawback and achieve an objective, a parking assist apparatus according to the present invention includes a setting unit that sets, within a captured image in which objects surrounding a moving vehicle have been imaged, a first search area for searching for a pair of partition lines disposed between parking spaces that are adjacent to each other; and a detecting unit that searches the first search area to detect a first partition line out of the pair of partition lines, wherein when the detecting unit detects the first partition line, the setting unit sets a second search area for searching for a second partition line out of the pair of partition lines on the basis of the first partition line.

In the parking assist apparatus according to the present invention, the second search area for searching for the second partition line is set on the basis of the first partition line that has been detected first. The parking assist apparatus thus can set the second partition line at an appropriate position in part of the captured image, so that time to detect the second partition line can be shortened.

In the parking assist apparatus according to the present invention, the setting unit may set the second search area smaller than the first search area.

The parking assist apparatus in the present invention thus can further shorten time to detect the second partition line, because the second partition line is detected within the second search area smaller than the first search area.

In the parking assist apparatus according to the present invention, the detecting unit determines whether to adopt the first partition line on the basis of parallelism between boundaries on both sides of the first partition line and a predetermined first parallel threshold.

In the parking assist apparatus according to the present invention, because it is thus determined whether to adopt the first partition line on the basis of parallelism between the boundaries on both sides of the first partition line and the first parallel threshold, a street gutter or the like, which is other than the first partition line, is suppressed from being mistakenly recognized as a partition line.

In the parking assist apparatus according to the present invention, the detecting unit determines whether to adopt the second partition line on the basis of parallelism between boundaries on both sides of the second partition line and a second parallel threshold that is greater than the predetermined first parallel threshold.

In the parking assist apparatus according to the present invention, because it is thus determined whether to adopt the second partition line on the basis of parallelism between the boundaries on both sides of the second partition line and the second parallel threshold, a street gutter or the like, which is other than the second partition line, is suppressed from being mistakenly recognized as a partition line. Additionally, by setting the second parallel threshold to be greater than the first parallel threshold, a correctly detected second partition line is suppressed from being mistakenly discarded.

In the parking assist apparatus according to the present invention, the detecting unit searches the first search area for the first partition line in a traveling direction of the vehicle, and searches the second search area for the second partition line in a direction opposite to the traveling direction of the vehicle.

With this, in the parking assist apparatus according to the present invention, the outer boundaries of the pair of partition lines required for the setting of the candidate parking space can be detected even more accurately.

DESCRIPTION OF EMBODIMENTS

Common reference symbols are given to like elements in the following exemplary embodiment and the like, and repetitive descriptions for those elements will be omitted, as appropriate.

Embodiment

Figure 1:
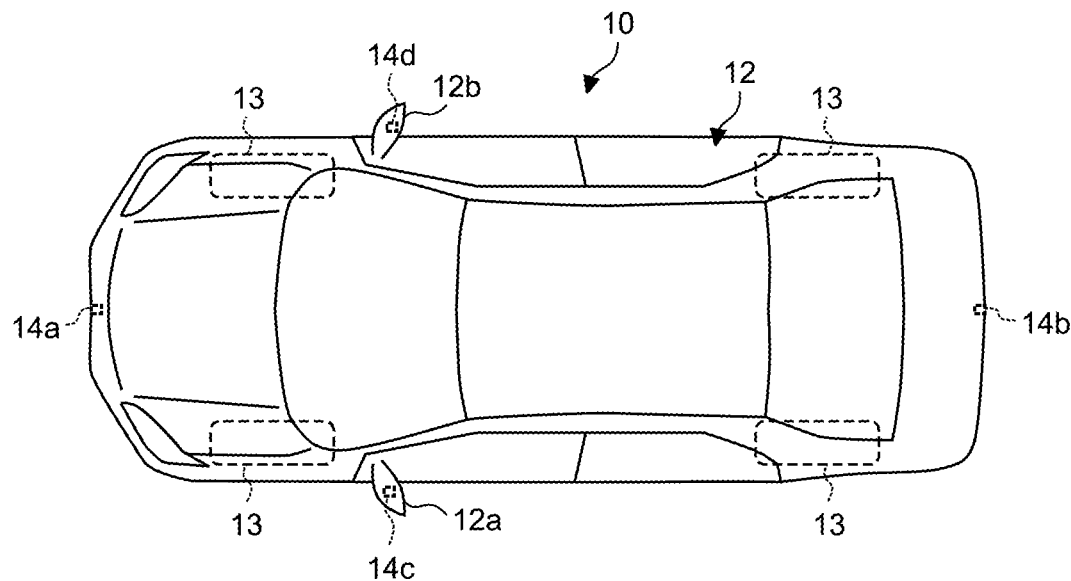
FIG. 1 is a plan view of a vehicle in which a parking assist apparatus according to an embodiment is mounted.

FIG. 1 is a plan view of a vehicle 10 in which a parking assist apparatus according to an embodiment is mounted. As illustrated in FIG. 1, the vehicle 10 includes a vehicle body 12 and four imaging units 14a, 14b, 14c, and 14d. The imaging units 14a, 14b, 14c, and 14d, when there is no need to differentiate one from the others, are referred to as the imaging unit(s) 14.

The vehicle body 12 constitutes a cabin in which occupants ride. The vehicle body 12 houses or holds components of the vehicle 10, including wheels 13 and the imaging units 14.

The imaging units 14 are a digital camera that incorporates therein, for example, an imaging element such as a CCD (Charge Coupled Device) or a CIS (CMOS Image Sensor). The imaging units 14 output, as data of a captured image, data of a moving image or a still image including a plurality of frame images generated at a predetermined frame rate. The imaging units 14 each include a wide-angle lens or a fisheye lens and can capture a range from 140 degrees to 190 degrees in a horizontal direction. Optical axes of the imaging units 14 are set directed obliquely downwards. Thus, the imaging units 14 output data of a captured image in which the vehicle 10 and objects surrounding the vehicle 10 including surrounding road surfaces have been imaged.

The imaging units 14 are disposed around the vehicle body 12. For example, the imaging unit 14a is disposed at a central portion in a left-right direction on a front end portion of the vehicle body 12 (e.g., at a front bumper). The imaging unit 14a generates a captured image in which objects anterior to the vehicle 10 have been imaged. The imaging unit 14b is disposed at a central portion in the left-right direction on a rear end portion of the vehicle body 12 (e.g., at a rear bumper). The imaging unit 14b generates a captured image in which objects posterior to the vehicle 10 have been imaged. The imaging unit 14c is disposed at a central portion in a fore-aft direction on a left end portion of the vehicle body 12 (e.g., at a side mirror 12a on the left-hand side). The imaging unit 14c generates a captured image in which objects to the left of the vehicle 10 have been imaged. The imaging unit 14d is disposed at a central portion in the fore-aft direction on a right end portion of the vehicle body 12 (e.g., at a side mirror 12b on the left-hand side). The imaging unit 14d generates a captured image in which objects to the right of the vehicle 10 have been imaged.

Figure 2:
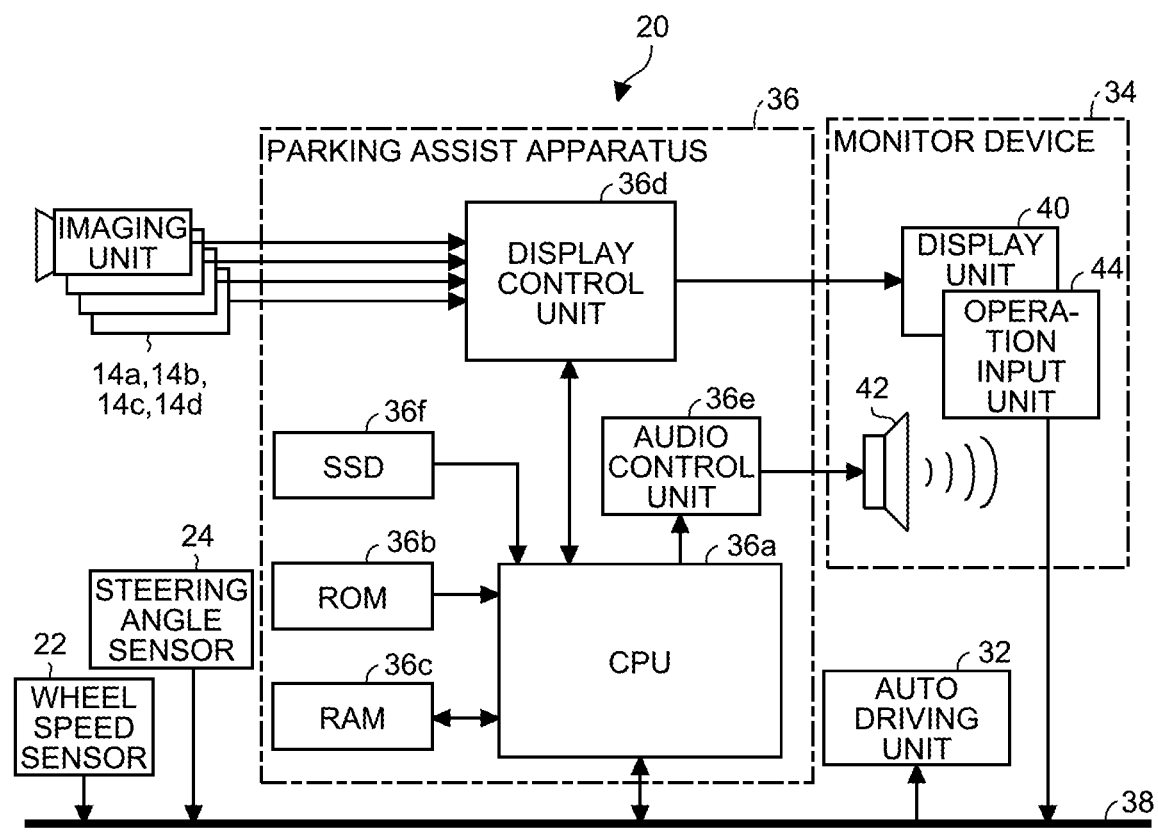
FIG. 2 is a block diagram illustrating a configuration of a parking assist system that includes the parking assist apparatus mounted in the vehicle.

FIG. 2 is a block diagram illustrating a configuration of a parking assist system 20 that includes this parking assist apparatus 36 mounted in the vehicle 10. As illustrated in FIG. 2, the parking assist system 20 includes a wheel speed sensor 22, a steering angle sensor 24, an auto driving unit 32, a monitor device 34, the parking assist apparatus 36, and an intra-vehicle network 38.

The wheel speed sensor 22 includes, for example, a Hall element or the like disposed near a wheel 13. The wheel speed sensor 22 outputs, as a sensor value, a wheel speed pulse count that indicates a detected speed of the specific wheel 13 to the intra-vehicle network 38.

The steering angle sensor 24 is disposed at a steering unit of, for example, a steering wheel or the like. The steering angle sensor 24 detects a steering angle that represents an amount or an angle of rotation of the steering unit achieved through an operation by a driver. The steering angle sensor 24 is, for example, a rotary encoder. The steering angle sensor 24 outputs the detected steering angle to the intra-vehicle network 38.

The auto driving unit 32 controls an accelerator, a brake, the steering wheel, and the like on the basis of an instruction from the parking assist apparatus 36 to thereby perform auto driving of the vehicle 10 during parking.

The monitor device 34 is disposed in a dashboard or the like in the cabin. The monitor device 34 includes a display unit 40, an audio output unit 42, and an operation input unit 44.

The display unit 40 displays an image on the basis of image data transmitted by the parking assist apparatus 36. The display unit 40 is a display device that may, for example, be a Liquid Crystal Display (LCD) or an Organic Electroluminescent Display (OELD). The display unit 40 displays, for example, a captured image on which a candidate parking space as a candidate for a space to park the vehicle 10 in auto driving is superimposed.

The audio output unit 42 outputs sound of voice on the basis of audio data transmitted by the parking assist apparatus 36. The audio output unit 42 may, for example, be a loudspeaker. The audio output unit 42 may be disposed at a position inside the cabin, the position being different from where the display unit 40 is disposed.

The operation input unit 44 receives an input by the occupant. The operation input unit 44 may, for example, be a touch panel. The operation input unit 44 is disposed in a display screen of the display unit 40. The operation input unit 44 is configured so as to cause an image displayed by the display unit 40 to be seen through. With this, the operation input unit 44 allows the occupant to view the image displayed on the display screen of the display unit 40. The operation input unit 44 receives an instruction input by the occupant touching a position corresponding to the image displayed on the display screen of the display unit 40 and transmits the instruction to the parking assist apparatus 36. When, for example, the occupant touches and selects a position of the candidate parking space displayed by the display unit 40, the operation input unit 44 outputs the parking instruction to the parking assist apparatus 36.

The parking assist apparatus 36 is a computer that includes a microprocessor such as an ECU (Electronic Control Unit). The parking assist apparatus 36 acquires data of the captured image from the imaging units 14. The parking assist apparatus 36 transmits to the monitor device 34 image or audio data generated on the basis of the captured image, for example. The parking assist apparatus 36 controls the auto driving unit 32 and assists the vehicle 10 by auto driving during parking. The parking assist apparatus 36 includes a CPU (Central Processing Unit) 36*a*, a ROM (Read Only Memory) 36*b*, a RAM (Random Access Memory) 36*c*, a display control unit 36*d*, an audio control unit 36*e*, and an SSD (Solid State Drive) 36*f*. The CPU 36*a*, the ROM 36*b*, and the RAM 36*c* may be integrated together within a single package.

The CPU 36*a*, which is an example of a hardware processor, reads out a program stored in a nonvolatile storage device such as the ROM 36*b*, and performs various types of arithmetic operations and controls in accordance with the program. The CPU 36*a* performs, for example, image processing on, for example, parking assist images to be displayed on the display unit 40.

The ROM 36*b* stores therein, for example, each program and parameters that are required to execute a program. The RAM 36*c* temporarily stores therein various types of data used in arithmetic operations in the CPU 36*a*. The display control unit 36*d* mainly performs, out of the arithmetic operations in the parking assist apparatus 36, image processing on images acquired by the imaging units 14, data conversion on display images to be displayed on the display unit 40, and the like. The audio control unit 36*e* mainly performs, out of the arithmetic operations in the parking assist apparatus 36, processing on sound of voice to be output to the audio output unit 42. The SSD 36*f*, which is a rewritable nonvolatile storage device, retains data even when power of the parking assist apparatus 36 is turned OFF.

The intra-vehicle network 38 includes, for example, a CAN (Controller Area Network) and a LIN (Local Interconnect Network). The intra-vehicle network 38 electrically connects the wheel speed sensor 22, the steering angle sensor 24, the auto driving unit 32, the parking assist apparatus 36, and the operation input unit 44 with each other so as to enable transmission and reception of signals and information.

In this embodiment, the parking assist apparatus 36 manages parking assist processing for the vehicle 10 through cooperation between hardware and software (control program). The parking assist apparatus 36 detects, from a captured image including images of surrounding objects captured by the imaging units 14, partition lines that partition parking spaces in a parking lot and sets one or a plurality of candidate parking spaces. The parking assist apparatus 36 controls the auto driving unit 32 to thereby assist in parking through movement into a candidate parking space selected by the occupant.

Figure 3:
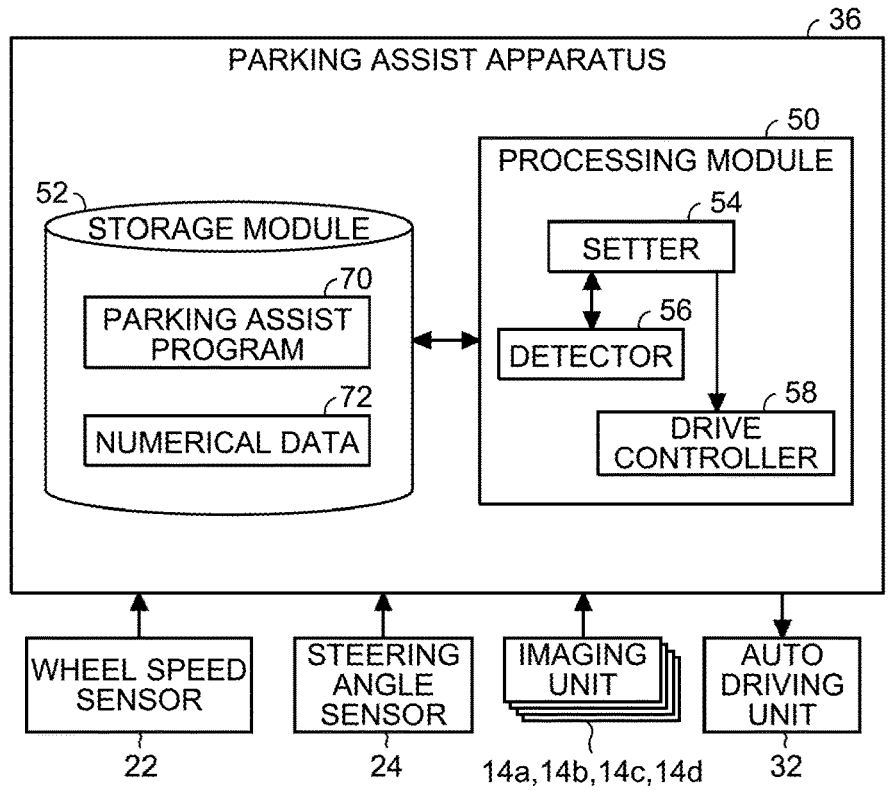
FIG. 3 is a functional block diagram illustrating functions of the parking assist apparatus.

FIG. 3 is a functional block diagram illustrating functions of the parking assist apparatus 36. As illustrated in FIG. 3, the parking assist apparatus 36 includes a processing module 50 and a storage module 52.

The processing module 50 is achieved as, for example, a function of the CPU 36*a* or the like. The processing module 50 includes a setting unit 54, a detecting unit 56, and a drive controlling unit 58. The processing module 50 may achieve functions of the setting unit 54, the detecting unit 56, and the drive controlling unit 58 by reading out a parking assist program 70 stored in the storage module 52. It is noted that the setting unit 54, the detecting unit 56, and the drive controlling unit 58 may be configured, in part or as a whole, by hardware including a circuit or the like that includes an ASIC (Application Specific Integrated Circuit).

The setting unit 54 acquires from the imaging units 14 captured images in which objects surrounding a moving vehicle 10 have been imaged. For example, the setting unit 54 acquires from the imaging units 14 a plurality of frame images of moving images at different points in time as the captured images. The setting unit 54 sets, within the captured images, search areas for searching for one partition line or a pair of partition lines provided between adjacent parking spaces and outputs the search areas to the detecting unit 56. An example of the partition lines is a white line provided on the ground of the parking lot. It is here noted that the setting unit 54 may set a search area, for example, in every several frames, instead of setting the search areas in all captured images. Alternatively, the setting unit 54 may set a next search area in a captured image acquired after processing for a previously-set search area is completed.

The setting unit 54 sets a first search area within a captured image on the basis of one or plural initial coordinates until the detecting unit 56, which will be described later, detects a first partition line of the pair of partition lines. The initial coordinate and a shape of the first search area may be included, for example, in numerical data 72, which is set in advance. The shape of the first search area may, for example, have a rectangular shape that may be a rectangle or a parallelogram having a size that generally encompasses at least the pair of partition lines. More specifically, until the first partition line is detected, the setting unit 54 sets such that a relative position between the vehicle 10 and the first search area is the initial coordinate in real world. For example, the setting unit 54 sets the first search area at a position on the left or right posterior to the vehicle 10 on the basis of the initial coordinate. The setting unit 54 next sets the first search area within the captured image through conversion from a coordinate system in the real world to a coordinate system in the captured image using, for example, a mapping table for coordinate conversion set in advance. The mapping table may be included in the numerical data 72. Furthermore, the setting unit 54 sets the first search area within each of the captured images that vary with movement of the vehicle 10, on the basis of the initial coordinate, the mapping table, and the like. It is here noted that, when the captured images are not subjected to, for example, enlargement, the setting unit 54 may set the first search area at an identical position (i.e., an identical coordinate) within the captured images.

The setting unit 54, upon acquisition of information on the first partition line that has been detected by the detecting unit 56, newly sets, on the basis of the detected first partition line, a position of a second search area for a search for a second partition line of the pair of partition lines. More specifically, the setting unit 54 sets the second search area in the real world such that a relative position between the position of the first partition line and the second search area in the real world is a set relative coordinate. The set relative coordinate and a shape of the second search area may be included, for example, in the numerical data 72, which is set in advance. The set relative coordinate represents, for example, a coordinate of a position of the detected first partition line moved in a direction perpendicular to a longitudinal direction of the first partition line (the direction is hereinafter referred to as a perpendicular direction). The set relative coordinate may be set on the basis of a distance between a first partition line and a second partition line of a common pair of partition lines. With this, the setting unit 54 is able to set the second search area at a position at which the second partition line is highly likely to exist with reference to the first partition line. The shape of the second search area may, for example, have a rectangular shape that may be a rectangle or a parallelogram having a size that generally encompasses at least the pair of partition lines. The setting unit 54 may set the second search area that is smaller than the first search area. The setting unit 54 sets the position of the second search area within the captured image through conversion from coordinates of the second search area in the real world to coordinates of the captured image on the basis of, for example, a mapping table.

When the detecting unit 56 detects a plurality of pairs of partition lines, the setting unit 54 sets a candidate parking space between a first pair of partition lines and a second pair of partition lines adjacent to the first pair. The setting unit 54 displays on the display unit 40 an image of the candidate parking space superimposed on the captured image of objects surrounding the vehicle 10 as a reception screen for receiving a parking instruction. Upon receipt of a parking instruction from the occupant via the operation input unit 44 during display of the reception screen, the setting unit 54 outputs to the drive controlling unit 58 the parking instruction and information on the position of the candidate parking space and the like.

The detecting unit 56 searches the first search area set by the setting unit 54 within the captured image to detect the first partition line of the pair of partition lines. The detecting unit 56 outputs to the setting unit 54 information on the detected first partition line. Additionally, the detecting unit 56 searches the second search area set by the setting unit 54 on the basis of the information on the first partition line to detect the second partition line of the pair of partition lines. The detecting unit 56 outputs to the setting unit 54 information on the detected second partition line. By repeatedly performing foregoing steps, the detecting unit 56 detects the adjacent pair of partition lines and outputs to the setting unit 54 information on the newly detected pair of partition lines.

The drive controlling unit 58 controls the auto driving unit 32 on the basis of the candidate parking space selected by the occupant from among the candidate parking spaces set by the setting unit 54. With this, the drive controlling unit 58 parks the vehicle 10 in the candidate parking space selected by the occupant.

The storage module 52 is achieved as the functions of the ROM 36b, the RAM 36c, the SSD 36f, and the like. The storage module 52 stores therein a program executed by the processing module 50, data required for the execution of the program, and the like. For example, the storage module 52 stores therein the parking assist program 70 executed by the processing module 50. The storage module 52 stores therein, for example, the numerical data 72 including the initial coordinate and the set relative coordinate, and the shape of the search area for setting the search area in the execution of the parking assist program 70.

FIGS. 4 to 8 are each a diagram illustrating a method for detecting a first partition line CLa out of a pair of partition lines CLa and CLb. In FIGS. 4 to 8, the area posterior to slant lines SL represents an imaging area imaged by the imaging unit 14b.

Figure 4:
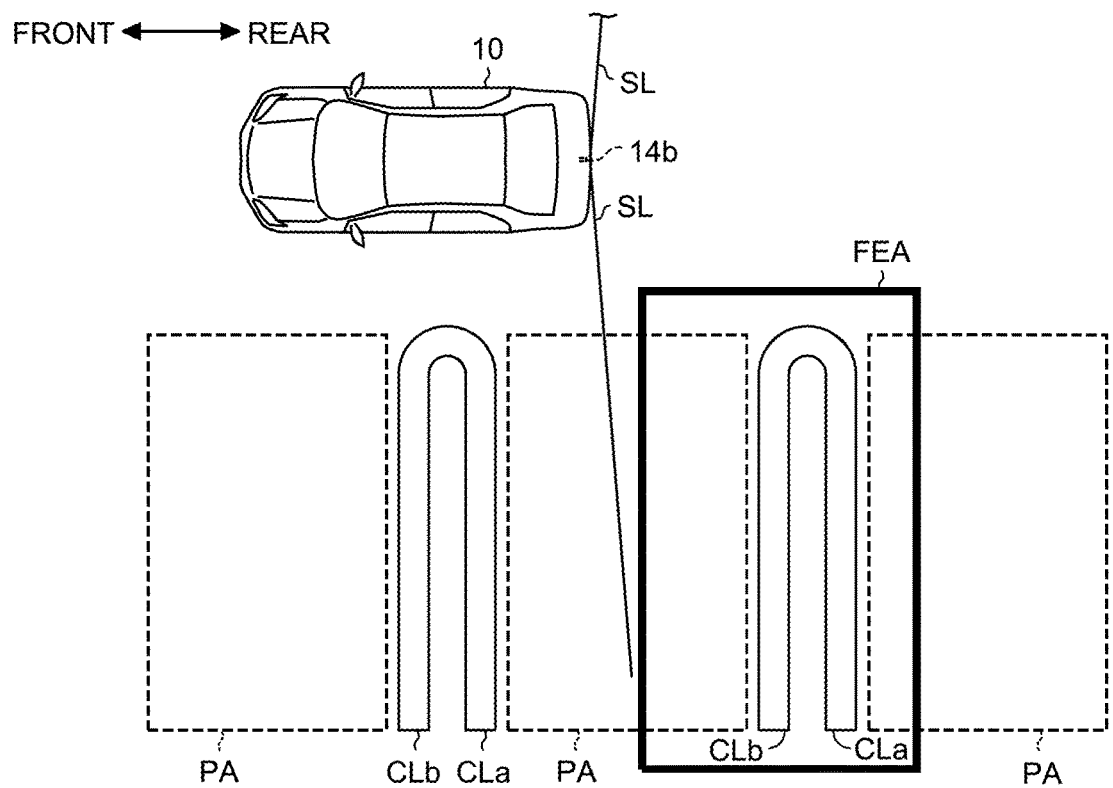
FIG. 4 is a diagram illustrating a method for detecting a first partition line out of a pair of partition lines.

As illustrated in FIG. 4, a first pair of partition lines CLa and CLb and a second pair of partition lines CLa and CLb are disposed on either side of a parking space PA. In other words, the pair of partition lines CLa and CLb is disposed between the parking space PA and a parking space PA adjacent thereto. The pair of partition lines CLa and CLb, while having a U-shape as illustrated in FIG. 4, may be separated from each other. The partition lines CLa and CLb, when there is no need to differentiate one from the other, are referred to as the partition line CL.

As illustrated in FIG. 4, the setting unit 54 sets a first search area FEA within the real world on the basis of the initial coordinate. For example, the setting unit 54 sets the first search area FEA using coordinates in the real world such that the relative position with respect to the vehicle 10 is the initial coordinate. The setting unit 54 uses a mapping table or the like to convert the coordinates of the first search area FEA to coordinates of the captured image that constitutes the frame image acquired from the imaging unit 14b. With this, the setting unit 54 sets the first search area FEA having a rectangular shape within the captured image.

Using methods such as edge detection, RANSAC (RANdom Sample Consensus), CONSAC (CONnected Sample Consensus), and the least-squares method, the detecting unit 56 detects the first partition line CLa of the pair of partition lines CLa and CLb within the first search area FEA set by the setting unit 54.

Figure 5:
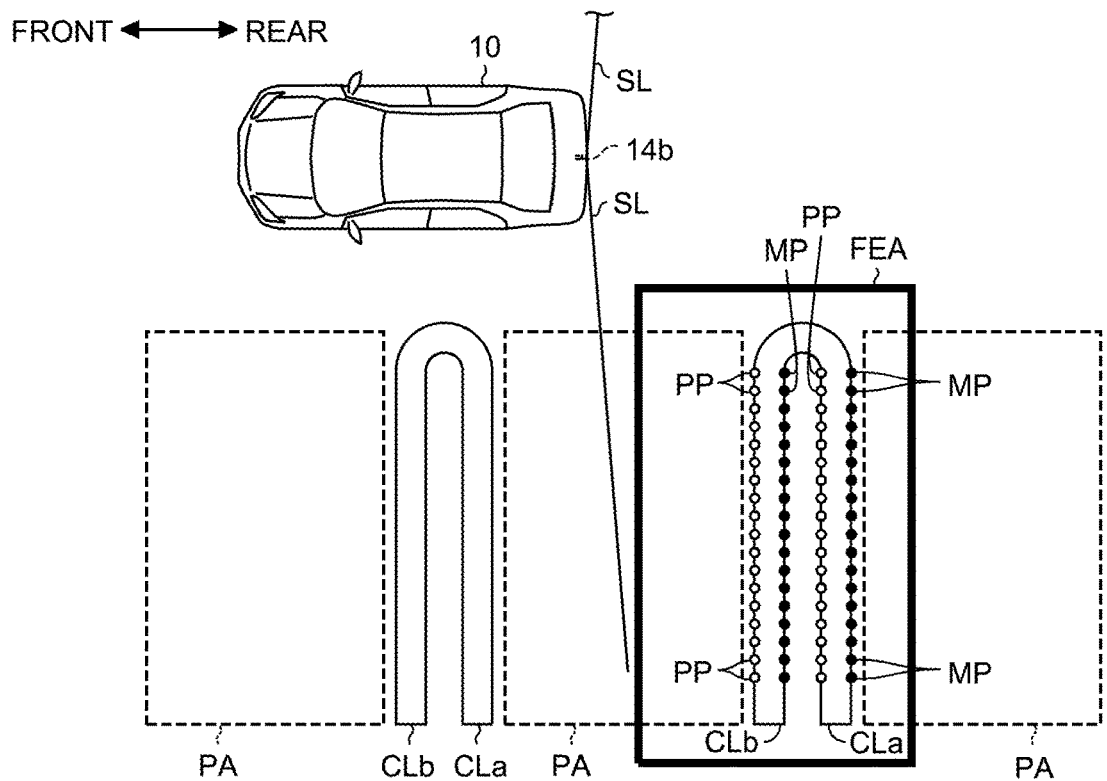
FIG. 5 is a diagram illustrating the method for detecting the first partition line out of the pair of partition lines.

More specifically, as illustrated in FIG. 5, the detecting unit 56 searches the first search area FEA set in the captured image by the setting unit 54 and detects minus edge points MP and plus edge points PP using the well-known edge detection or the like. The minus edge points MP, as used herein, are points at which the image changes from dark to bright. The minus edge points MP is, for example, a point on a boundary on which a black road surface turns to a white partition line CL. The plus edge points PP, as used herein, are points at which the image changes from bright to dark. The plus edge points PP is, for example, a point on a boundary on which a white partition line CL turns to a black road surface. In FIG. 5, the minus edge points MP are indicated by the black dots and the plus edge points PP are indicated by the blank dots.

Figure 6:
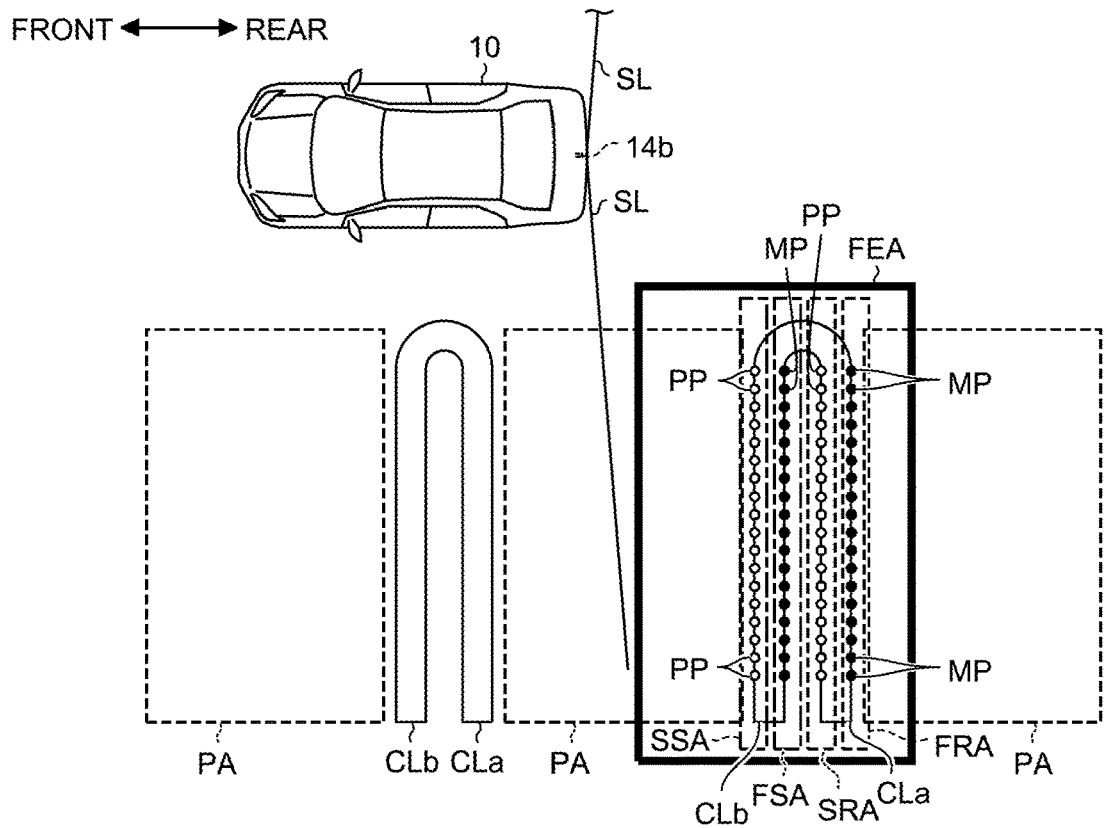
FIG. 6 is a diagram illustrating the method for detecting the first partition line out of the pair of partition lines.

As illustrated in FIG. 6, the detecting unit 56 sets, for detection of the partition line CLa, a first reference area FRA, a second reference area SRA, a first subsidiary area FSA, and a second subsidiary area SSA within the first search area FEA. The detecting unit 56 may set the first reference area FRA, the second reference area SRA, the first subsidiary area FSA, and the second subsidiary area SSA, in sequence from the rear side, for example. The detecting unit 56 may first set such that the first reference area FRA has a rear end portion aligned with a rear end portion of the first search area FEA. It is noted that the detecting unit 56 may set the second reference area SRA and the second subsidiary area SSA at timing different from timing at which the detecting unit 56 sets the first reference area FRA and the first subsidiary area FSA. A distance between the first reference area FRA and the first subsidiary area FSA, and a distance between the second reference area SRA and the second subsidiary area SSA may be set as the numerical data 72 in advance. The first reference area FRA, the second reference area SRA, the first subsidiary area FSA, and the second subsidiary area SSA may partially overlap each other.

The first reference area FRA and the first subsidiary area FSA are areas for calculating the number of minus edge points MP (hereinafter referred to as minus point) of the partition line CL. Thus, the detecting unit 56 counts the number of minus edge points MP of the partition line CL included in the first reference area FRA and the first subsidiary area FSA to thereby calculate the minus point. The second reference area SRA and the second subsidiary area SSA are areas for calculating the number of plus edge points PP (hereinafter referred to as plus point) of the partition line CL. Thus, the detecting unit 56 counts the number of plus edge points PP of the partition line CL included in the second reference area SRA and the second subsidiary area SSA to thereby calculate the plus point.

Figure 7:
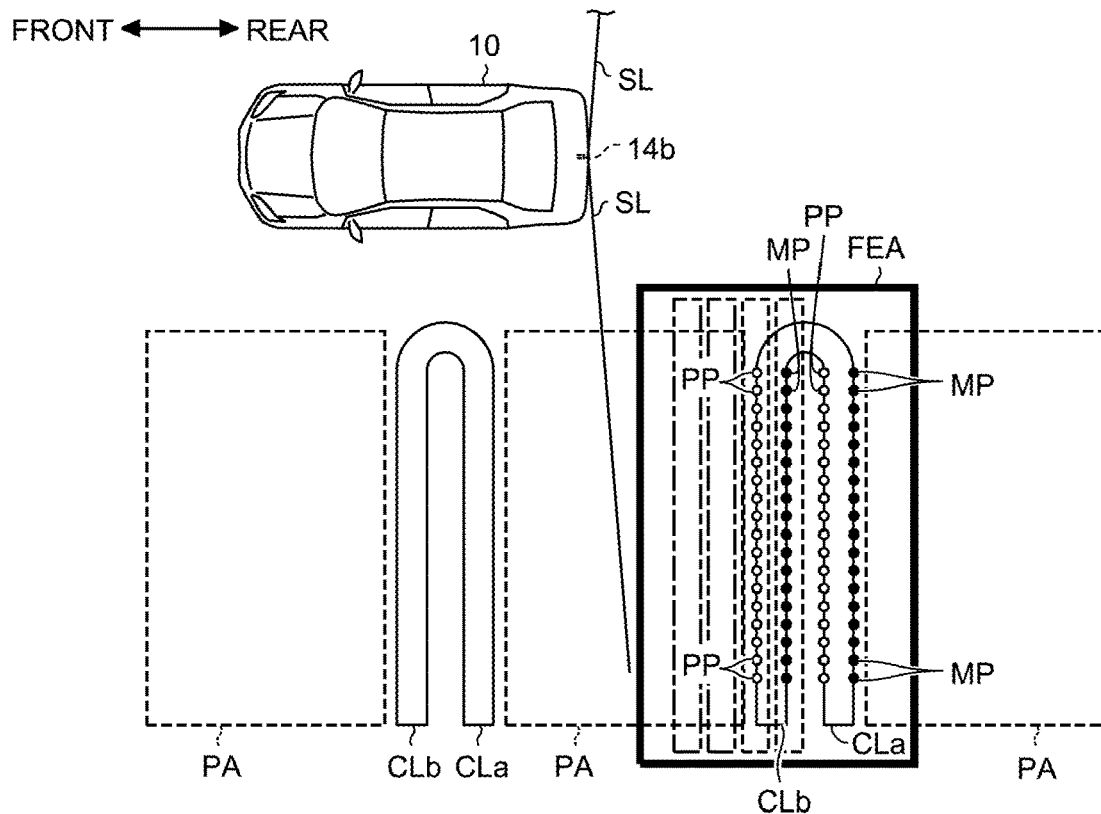
FIG. 7 is a diagram illustrating the method for detecting the first partition line out of the pair of partition lines.

In order to search for the first partition line CLa, the detecting unit 56 moves each of the areas FRA and FSA from the rear end portion to a front end portion of the first search area FEA at a predetermined interval as illustrated in FIG. 7. In other words, the detecting unit 56 searches for the first partition line CLa in the first search area FEA in a traveling direction of the vehicle 10. Additionally, the detecting unit 56 rotates the areas FRA and FSA about a vertical axis at each position to thereby change directions. It is noted that the detecting unit 56 changes positions and directions of each of the areas FRA and FSA, while maintaining mutual parallelism between the areas FRA and FSA. The detecting unit 56 counts the number of minus edge points MP in the areas FRA and FSA at each of the positions and in each of the directions to thereby calculate the minus point. The detecting unit 56 identifies a position and a direction of each of the areas FRA and FSA so that the minus point becomes the greatest.

In order to search for the first partition line CLa, the detecting unit 56 moves each of the areas SRA and SSA from the rear end portion to the front end portion of the first search area FEA at a predetermined interval. In other words, the detecting unit 56 searches for the first partition line CLa in the first search area FEA in the traveling direction of the vehicle 10. Additionally, the detecting unit 56 rotates the areas SRA and SSA about the vertical axis at each position to thereby change directions. It is noted that the detecting unit 56 changes positions and directions of each of the areas SRA and SSA, while maintaining mutual parallelism between the areas SRA and SSA. The detecting unit 56 counts the number of plus edge points PP in the areas SRA and SSA at each of the positions and in each of the directions to thereby calculate the plus point. The detecting unit 56 identifies a position and a direction of each of the areas SRA and SSA so that the plus point becomes the greatest.

Under the condition illustrated in FIG. 6, for example, the edge points MP and PP are included in all of the areas FRA, SRA, FSA, and SSA, which yields greater minus point and plus point. Under the condition illustrated in FIG. 7, the edge points MP and PP are not included in the subsidiary area FSA or SSA, which yields smaller minus point and plus point. The detecting unit 56 thus identifies the areas FRA, SRA, FSA, and SSA under the condition illustrated in FIG. 6 as the position and the direction yielding the greatest points and detects the first partition line CLa on the basis of the reference areas FRA and SRA under the condition.

Figure 8:
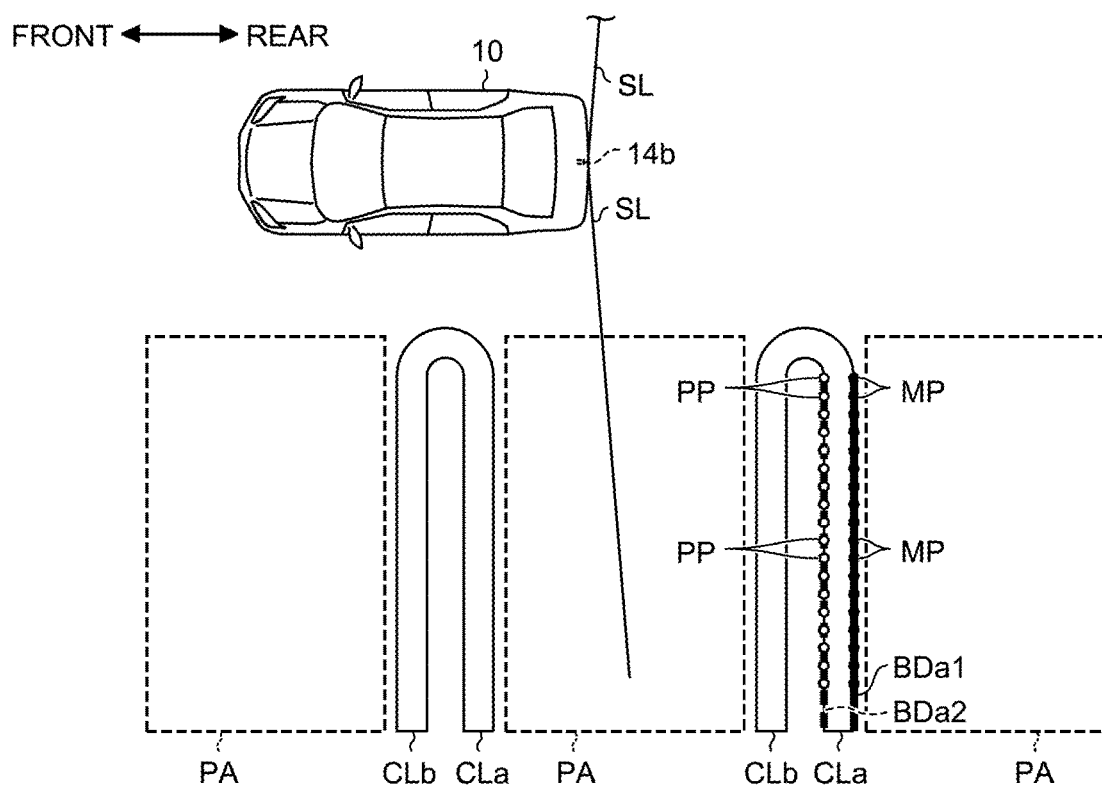
FIG. 8 is a diagram illustrating the method for detecting the first partition line out of the pair of partition lines.
Figure 9:
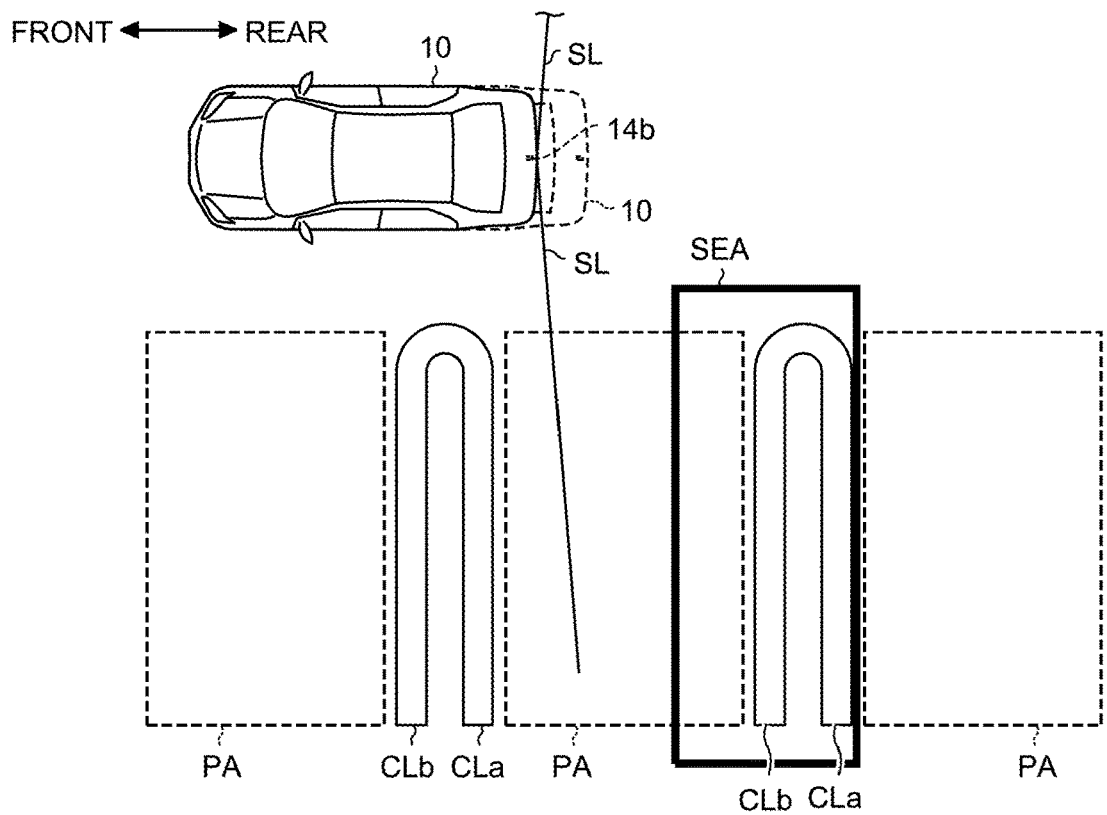
FIG. 9 is a diagram illustrating a method for detecting a second partition line out of the pair of partition lines.

More specifically, as illustrated in FIG. 8, the detecting unit 56 detects, as an outer boundary BDa1 of the first partition line CLa, a straight line that is generated by applying the least-squares method to a plurality of minus edge points MP which are left after noise (i.e., outliers) is eliminated using the RANSAC or CONSAC from the minus edge points MP included in the first reference area FRA of which minus point is the greatest. The boundary BDa1 is indicated by a broad solid line. By performing the identical procedures, the detecting unit 56 detects, as an inner boundary BDa2 of the first partition line CLa, a straight line that is generated by applying the least-squares method to a plurality of plus edge points PP which obtained by eliminating noise from the plus edge points PP included in the second reference area SRA of which plus point is the greatest. The boundary BDa2 is indicated by a broad dotted line.

The detecting unit 56 may determine whether to adopt the detected first partition line CLa on the basis of parallelism between the two boundaries BDa1 and BDa2 of the first partition line CLa and a predetermined first parallel threshold. The parallelism may, for example, be an angle at which the boundary BDa1 crosses the boundary BDa2. The first parallel threshold is included in the numerical data 72 and may, for example, be several degrees. When the parallelism between the boundaries BDa1 and BDa2 is smaller than the first parallel threshold, for example, the detecting unit 56 may adopt the partition line CLa. When the parallelism between the boundaries BDa1 and BDa2 is equal to or greater than the first parallel threshold, the detecting unit 56 may opt not to adopt the partition line CLa and may erase data and detect a new partition line CLa. The detecting unit 56 outputs to the setting unit 54 information on the boundaries BDa1 and BDa2, which the detecting unit 56 has determined to adopt, as information on the first partition line CLa.

FIGS. 9 to 13 are each a diagram illustrating a method for detecting the second partition line CLb out of the pair of partition lines CLa and CLb. FIGS. 9 to 13 each illustrate where the vehicle 10 has moved forward from the position illustrated in FIG. 6 and indicated by the dotted line in FIG. 9. The setting unit 54 acquires a new captured image imaged by the imaging unit 14b under the condition in which the vehicle 10 has moved forward.

The setting unit 54 sets a second search area SEA for detecting the second partition line CLb on the basis of the information on the first partition line CLa acquired from the detecting unit 56. More specifically, the setting unit 54 sets, on the basis of information on a wheel speed acquired from the wheel speed sensor 22 and on a steering angle acquired from the steering angle sensor 24, the second search area SEA for detecting the second partition line CLb from a position of the first partition line CLa (for example, a central position between the boundaries BDa1 and BDa2 of the first partition line CLa) to a position of the set relative coordinate in real world.

The setting unit 54 may set the second search area SEA having a rectangular shape smaller than the first search area FEA. Specifically, the setting unit 54 may set the second search area SEA, which has a width in the perpendicular direction of the partition lines CLa and CLb (or the traveling direction of the vehicle 10) smaller than that of the first search area FEA. The setting unit 54 sets the second search area SEA, which has been set in the real world, within the captured image by coordinate conversion using a mapping table or the like. The setting unit 54 outputs information on the set second search area SEA to the detecting unit 56.

Figure 10:
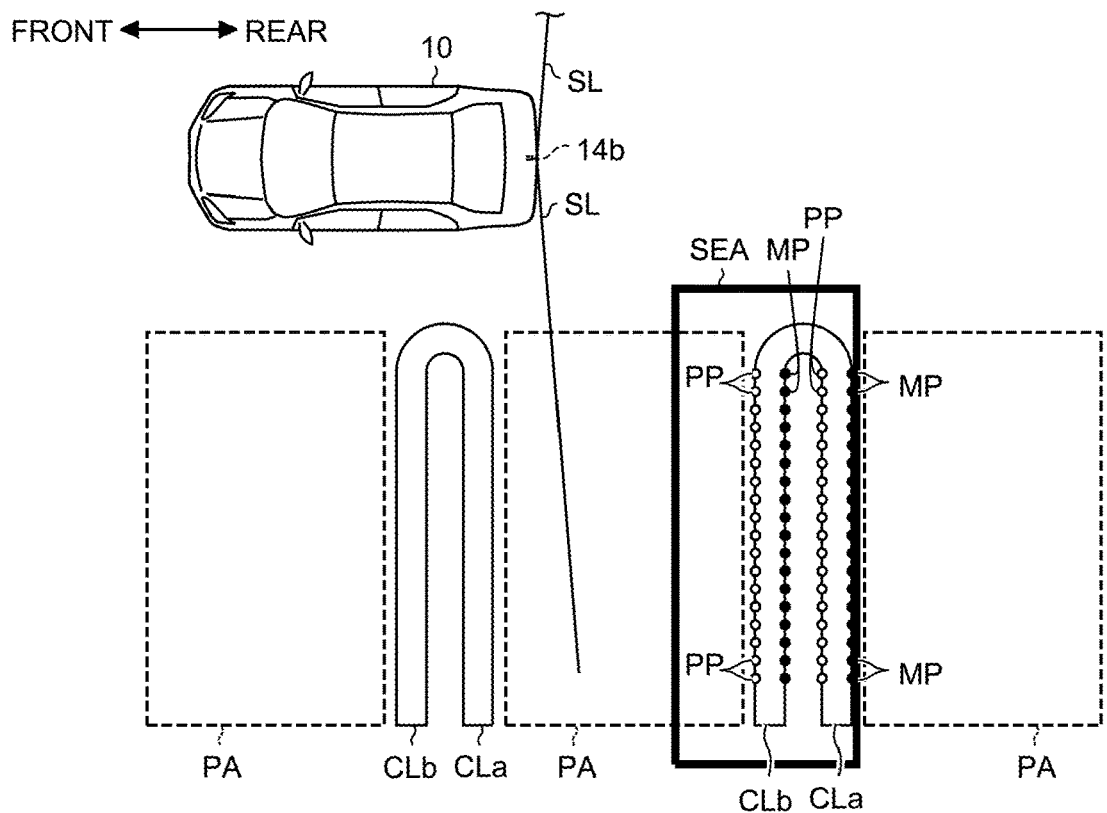
FIG. 10 is a diagram illustrating the method for detecting the second partition line out of the pair of partition lines.

As illustrated in FIG. 10, the detecting unit 56 searches the second search area SEA using edge detection or the like, and detects the minus edge points MP and the plus edge points PP.

Figure 11:
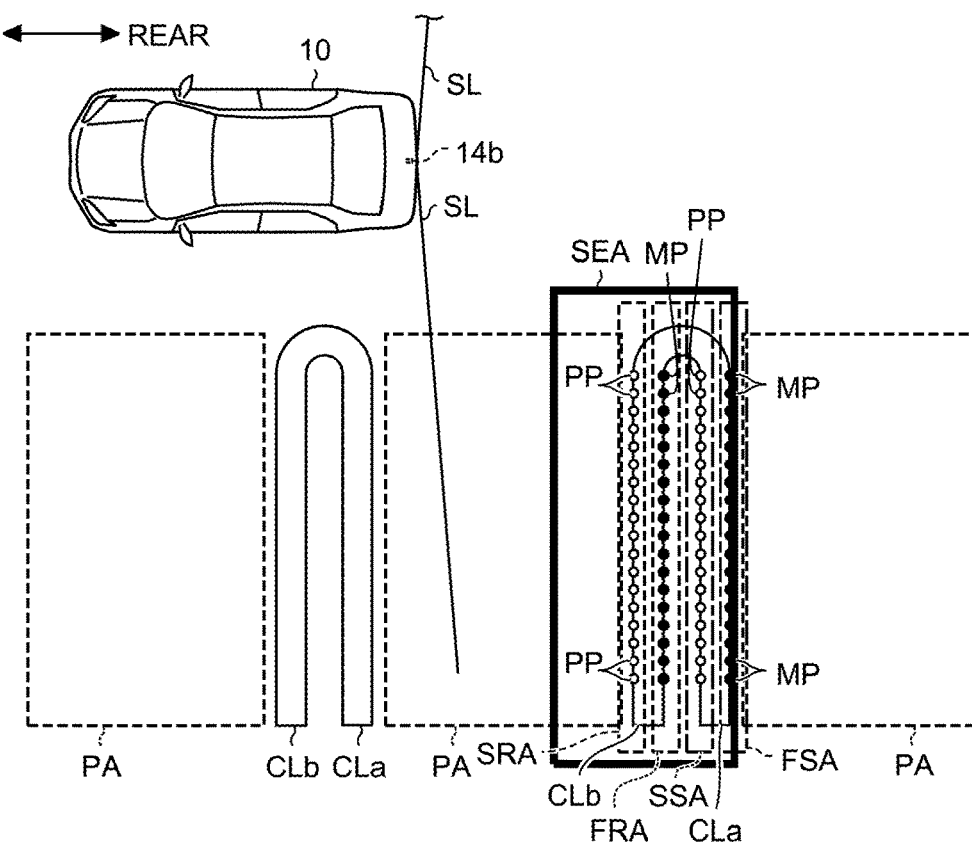
FIG. 11 is a diagram illustrating the method for detecting the second partition line out of the pair of partition lines.

As illustrated in FIG. 11, the detecting unit 56 sets the first reference area FRA, the second reference area SRA, the first subsidiary area FSA, and the second subsidiary area SSA within the second search area SEA. The detecting unit 56 sets the second reference area SRA, the first reference area FRA, the second subsidiary area SSA, and the first subsidiary area FSA, in sequence from the front side. Specifically, the detecting unit 56 sets in the second search area SEA the areas SRA, FRA, SSA, and FSA in sequence different from the sequence applied to the first search area FEA. The detecting unit 56 may first set the areas SRA, FRA, SSA, and FSA within the second search area SEA such that the second reference area SRA has a front end portion aligned with a front end portion of the second search area SEA. The detecting unit 56 calculates the plus point that represents the number of plus edge points PP within the second reference area SRA and the second subsidiary area SSA, and the minus point that represents the number of minus edge points MP within the first reference area FRA and the first subsidiary area FSA.

Figure 12:
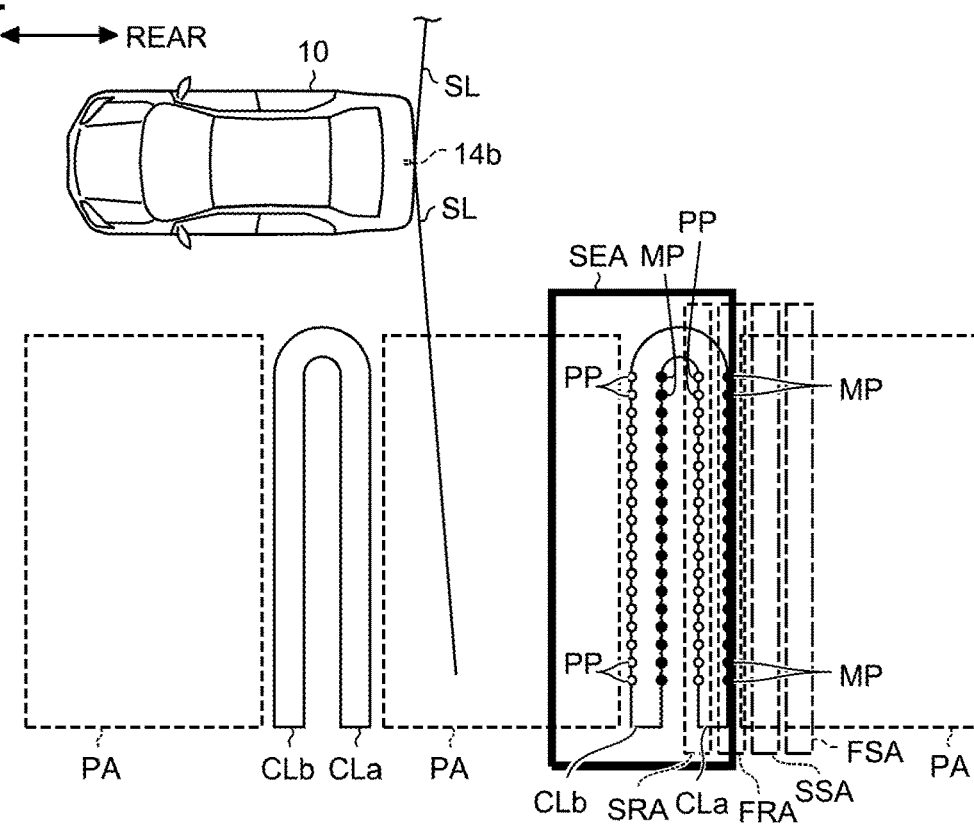
FIG. 12 is a diagram illustrating the method for detecting the second partition line out of the pair of partition lines.

In order to search for the second partition line CLb, the detecting unit 56 moves each of the areas SRA and SSA from the front end portion to a rear end portion of the second search area SEA at a predetermined interval as illustrated in FIG. 12. In other words, the detecting unit 56 searches for the second partition line CLb in the second search area SEA in a direction opposite to the traveling direction of the vehicle 10. Additionally, the detecting unit 56 rotates the areas SRA and SSA about the vertical axis at each position to thereby change directions. It is noted that the detecting unit 56 changes positions and directions of each of the areas SRA and SSA, while maintaining mutual parallelism between the areas SRA and SSA. The detecting unit 56 counts the number of plus edge points PP in the areas SRA and SSA at each of the positions and in each of the directions to thereby calculate the plus point. The detecting unit 56 identifies a position and a direction of each of the areas SRA and SSA so that the plus point becomes the greatest.

In order to search for the second partition line CLb, the detecting unit 56 moves each of the areas FRA and FSA from the front end portion to the rear end portion of the second search area SEA at a predetermined interval. In other words, the detecting unit 56 searches for the second partition line CLb in the second search area SEA in the direction opposite to the traveling direction of the vehicle 10. Additionally, the detecting unit 56 rotates the areas FRA and FSA about the vertical axis at each position to thereby change directions. It is noted that the detecting unit 56 changes positions and directions of each of the areas FRA and FSA, while maintaining mutual parallelism between the areas FRA and FSA. The detecting unit 56 counts the number of minus edge points MP in the areas FRA and FSA at each of the positions and in each of the directions to thereby calculate the minus point. The detecting unit 56 identifies a position and a direction of each of the areas FRA and FSA so that the minus point becomes the greatest.

The detecting unit 56 detects the position and the direction of the second partition line CLb out of the pair of partition lines CLa and CLb on the basis of the second reference area SRA at the position and in that direction of which plus point is the greatest and that first reference area FRA at the position and in the direction of which minus point is the greatest. Under the state illustrated in FIG. 11, for example, because the edge points MP and PP within the second search area SEA are included in the areas SRA, FRA, and SSA, the plus point and the minus point become greater. It is noted that the detecting unit 56 does not count the edge points MP and PP on the boundary of the second search area SEA (in this case, the minus edge points MP of the first partition line CLa). Under the state illustrated in FIG. 12, because the edge points MP and PP within the second search area SEA are not included in the areas FRA, SSA, and FSA, the plus point and the minus point become smaller. The detecting unit 56 thus detects the second partition line CLb on the basis of the reference areas FRA and SRA under the state illustrated in FIG. 11.

Figure 13:
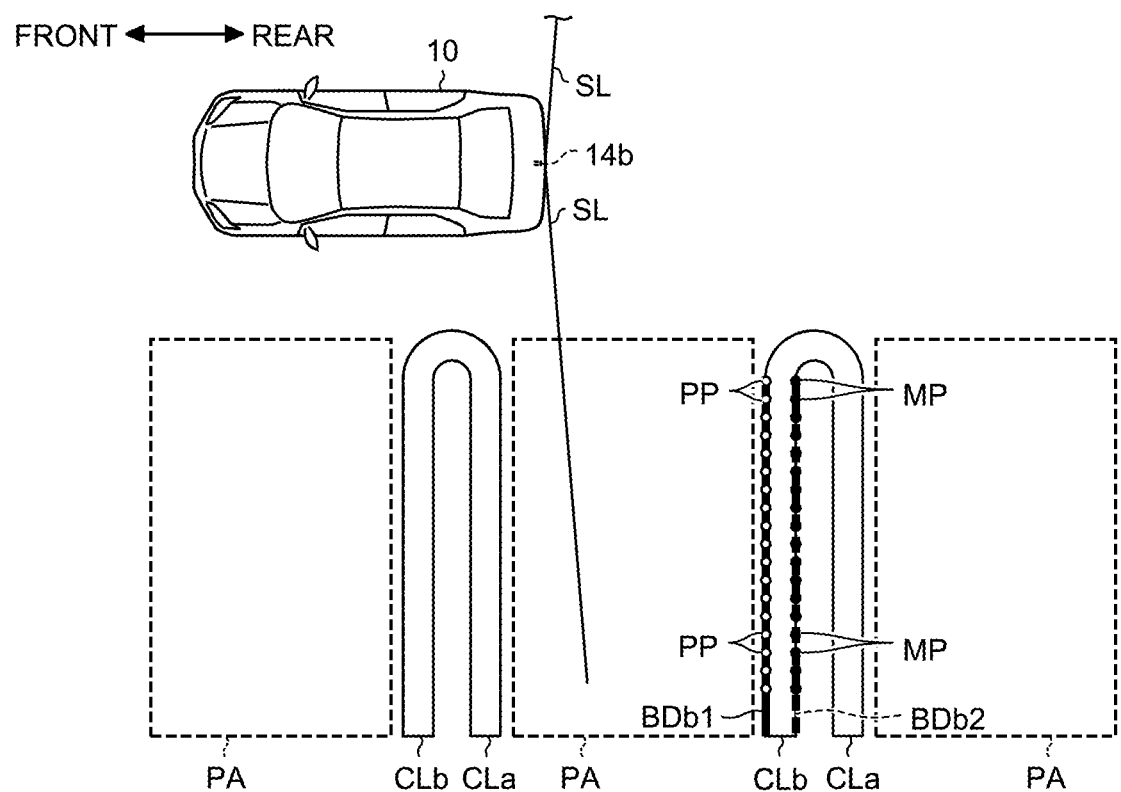
FIG. 13 is a diagram illustrating the method for detecting the second partition line out of the pair of partition lines.

More specifically, as illustrated in FIG. 13, the detecting unit 56 detects, as an outer boundary BDb1 of the second partition line CLb, a straight line that is generated by applying the least-squares method to a plurality of plus edge points PP which are left after noise (i.e., outliers) is eliminated using the RANSAC or CONSAC from the plus edge points PP included in the second reference area SRA. The boundary BDb1 is indicated by a broad solid line. By performing the identical procedures, the detecting unit 56 detects, as an inner boundary BDb2 of the second partition line CLb, a straight line that is generated by applying the least-squares method to a plurality of minus edge points MP which are obtained by eliminating noise from the minus edge points MP included in the first reference area FRA of which the minus point is the greatest.

The detecting unit 56 may determine whether to adopt the detected second partition line CLb on the basis of parallelism between the two boundaries BDb1 and BDb2 of the second partition line CLb and a predetermined second parallel threshold. When the parallelism between the boundaries BDb1 and BDb2 is smaller than the second parallel threshold, for example, the detecting unit 56 may adopt the partition line CLb. When the parallelism between the boundaries BDb1 and BDb2 is equal to or greater than the second parallel threshold, the detecting unit 56 may opt not to adopt the partition line CLb and may erase data and detect new partition lines CLa and CLb. The second parallel threshold is, for example, greater than the first parallel threshold. The detecting unit 56 outputs to the setting unit 54 information on the boundaries BDb1 and BDb2, which the detecting unit 56 has determined to adopt, as information on the second partition line CLb.

Figure 14:
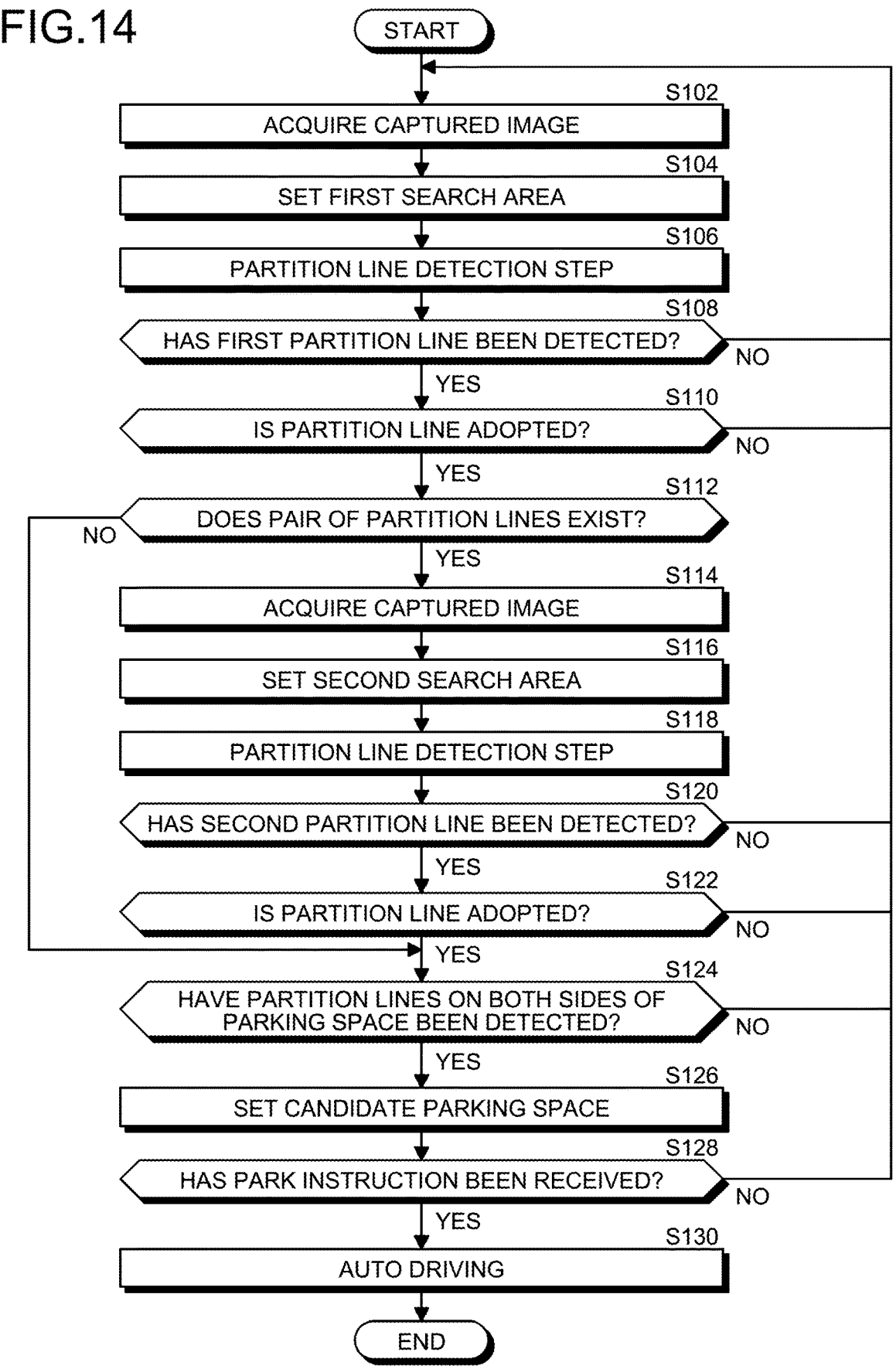
FIG. 14 is a flowchart of a parking assist process performed by a processing module.

FIG. 14 is a flowchart of a parking assist process performed by the processing module 50. The processing module 50 performs the parking assist process by reading out the parking assist program 70.

As illustrated in FIG. 14, in the parking assist process, the setting unit 54 acquires a captured image from the imaging unit 14b (S102).

The setting unit 54 sets the first search area FEA within the captured image (S104). More specifically, as illustrated in FIG. 4, the setting unit 54 sets the first search area FEA within the real world on the basis of the initial coordinate. The setting unit 54 sets the first search area FEA within the captured image by coordinate conversion using a mapping table or the like. The setting unit 54 outputs information on the first search area FEA to the detecting unit 56.

The detecting unit 56 performs a step of detecting the first partition line CLa out of the pair of partition lines CLa and CLb through a search of the first search area FEA (S106). More specifically, as illustrated in FIGS. 4 to 7, the detecting unit 56 detects the edge points MP and PP within the first search area FEA and determines positions and directions of the areas FRA, SRA, FSA, and SSA so that the minus point and the plus point become the greatest. As illustrated in FIG. 8, the detecting unit 56 detects the boundaries BDa1 and BDa2 of the partition line CLa on the basis of the edge points MP and PP within the areas FRA, SRA, FSA, and SSA at the positions and in the directions.

The detecting unit 56 determines whether the boundaries BDa1 and BDa2 of the first partition line CLa have been detected (S108). When the detecting unit 56 determines that the boundaries BDa1 and BDa2 of the partition line CLa have not been detected (No at S108), Step S102 and subsequent steps are repeatedly performed.

The detecting unit 56, when having determined that the boundaries BDa1 and BDa2 of the partition line CLa have been detected (Yes at S108), determines whether to adopt the detected partition line CLa (S110). The detecting unit 56 may determine whether to adopt the partition line CLa on the basis of, for example, the parallelism between the boundaries BDa1 and BDa2 and the first parallel threshold. When the parallelism between the boundaries BDa1 and BDa2 is equal to or greater than the first parallel threshold, the detecting unit 56 determines not to adopt the partition line CLa (No at S110) and erases the information on the partition line CLa, and Step S102 and subsequent steps are repeatedly performed.

When the parallelism between the boundaries BDa1 and BDa2 is smaller than the first parallel threshold, the detecting unit 56 determines to adopt the partition line CLa (Yes at S110) and determines whether the pair of partition lines CLa and CLb exists between the parking spaces PA and PA (S112). The detecting unit 56 may determine whether the pair of partition lines CLa and CLb exists between the parking spaces PA and PA on the basis of, for example, values of the greatest minus point and plus point. More specifically, when only one partition line CL exists between the parking spaces PA and PA, the partition line CL exists only in either of the reference areas FRA and SRA or the subsidiary areas FSA and SSA. Thus, the greatest minus point and plus point when only one partition line CL exists between the parking spaces PA and PA are smaller than the greatest minus point and plus point when the pair of partition lines CLa and CLb exists between the parking spaces PA and PA. Thus, the detecting unit 56 may determine that the pair of partition lines CLa and CLb exists when the greatest minus point and plus point are equal to or greater than a determination threshold. On the other hand, when the greatest minus point or plus point is smaller than the determination threshold, the detecting unit 56 may determine that only one partition line CL exists. The determination threshold may be set to about half of an average value of the greatest minus point and plus point when the pair of partition lines CLa and CLb exists.

The detecting unit 56, when having determined that only one partition line CL, instead of the pair of partition lines CLa and CLb, exists between the parking spaces PA and PA (No at S112), performs Step S124 to be described later.

The detecting unit 56, when having determined that the pair of partition lines CLa and CLb exists between the parking spaces PA and PA (Yes at S112), outputs information on the detected first partition line CLa (for example, information on the boundaries BDa1 and BDa2) to the setting unit 54.

More specifically, in order to detect the second partition line CLb out of the pair of partition lines CLa and CLb between the same parking spaces PA and PA on the basis of the detected first partition line CLa, the setting unit 54 acquires a new captured image from the imaging unit 14b (S114).

The setting unit 54 sets the second search area SEA in the new captured image (S116). More specifically, the setting unit 54 sets in real world the second search area SEA, which is smaller than the first search area FEA, from the position of the detected first partition line CLa acquired from the detecting unit 56 to the position of the set relative coordinate. The setting unit 54 uses a mapping table or the like to perform conversion from the coordinates in the real world to the coordinates of the captured image, to thereby set the second search area SEA within the captured image. The setting unit 54 outputs information on the second search area SEA to the detecting unit 56.

The detecting unit 56 performs a step of detecting the second partition line CLb out of the pair of partition lines CLa and CLb through a search of the second search area SEA (S118). More specifically, the detecting unit 56 detects the edge points MP and PP within the second search area SEA and determines positions and directions of the areas FRA, SRA, FSA, and SSA of which the minus point and the plus point become greatest. The detecting unit 56 detects the boundaries BDb1 and BDb2 of the second partition line CLb on the basis of the edge points MP and PP within the areas FRA, SRA, FSA, and SSA at the positions and in the directions.

The detecting unit 56 determines whether the boundaries BDb1 and BDb2 of the second partition line CLb have been detected (S120). When the detecting unit 56 determines that the boundaries BDb1 and BDb2 of the partition line CLb have not been detected (No at S120), Step S102 and subsequent steps are repeatedly performed.

The detecting unit 56, when having determined that the boundaries BDb1 and BDb2 of the partition line CLb have been detected (Yes at S120), determines whether to adopt the detected partition line CLb (S122). The detecting unit 56 may determine whether to adopt the partition line CLb on the basis of, for example, the parallelism between the boundaries BDb1 and BDb2 and the second parallel threshold. When the parallelism between the boundaries BDb1 and BDb2 is equal to or greater than the second parallel threshold, the detecting unit 56 determines not to adopt the partition line CLb (No at S122) and erases the information on the partition lines CLa and CLb, and Step S102 and subsequent steps are repeatedly performed.

When the parallelism between the boundaries BDb1 and BDb2 is smaller than the second parallel threshold, the detecting unit 56 determines to adopt the partition line CLb (Yes at S122) and outputs information on the boundaries BDb1 and BDb2 of the detected partition line CLb to the setting unit 54.

The setting unit 54, having received the information on the boundaries BDb1 and BDb2 of the partition line CLb, next determines whether the partition lines CL have been detected on both sides of the parking space PA (S124). When the setting unit 54 has detected one pair of partition lines CLa and CLb on a first side of a parking space PA (e.g., on the rear side of the vehicle 10) and another pair of partition lines CLa and CLb on a second side of the parking space PA (e.g., on the front side of the vehicle 10), for example, the setting unit 54 determines that the partition lines CL have been detected on both sides of the parking space PA. Similarly, when the setting unit 54 has detected one partition line CL on a first side of a parking space PA and another partition line CL on a second side of the parking space PA, for example, the setting unit 54 determines that the partition line CL has been detected on either side of the parking space PA. It is noted that, when two pairs of partition lines CLa and CLb have been detected, the setting unit 54 may determine that the partition lines CLa and CLb have been detected on either side of one parking space PA on the basis of an interval between the first pair of partition lines CLa and CLb and the second pair of partition lines CLa and CLb.

The setting unit 54, when having determined that the partition line CL has been detected only on one side of the parking space PA (No at S124), repeatedly performs Step S102 and subsequent steps to detect a partition line CL on a side opposite from the side of the parking space PA on which the partition line CL has been detected.

The setting unit 54, when having determined that the partition lines CL have been detected on both sides of the parking space PA (Yes at S124), sets a candidate parking space between the two pairs of partition lines CLa and CLb (or two partition lines CL) (S126).

The setting unit 54 determines whether a parking instruction has been received (S128). The setting unit 54 may, for example, receive a parking instruction from the operation input unit 44 by displaying on the display unit 40 the reception screen that represents an image of the candidate parking space superimposed on the captured image. The setting unit 54 may, for example, determine that a parking instruction has been received when the occupant touches a candidate parking space on the operation input unit 44. The setting unit 54 may determine that the parking instruction has not been received when having received no parking instruction after a lapse of a predetermined period of time after the display of the reception screen or until the vehicle 10 has traveled a predetermined distance.

When the setting unit 54 has determined that no parking instruction has been received (No at S128), the setting unit 54 and the detecting unit 56 repeatedly perform Step S102 and subsequent steps to detect new partition lines CLa and CLb.

The setting unit 54, when having determined that a parking instruction has been received (Yes at S128), outputs the parking instruction to the drive controlling unit 58.

The drive controlling unit 58, upon receipt of the parking instruction, controls the auto driving unit 32 to thereby perform auto driving of the vehicle 10, thus park the vehicle 10 in the candidate parking space selected by the occupant (S130). The processing module 50 thereby terminates the parking assist process.

As described above, in the parking assist apparatus 36, the second search area SEA for searching for the second partition line CLb is set on the basis of the first partition line CLa, which has been detected first out of the pair of partition lines CLa and CLb. The parking assist apparatus 36 thus can set a small area for searching for the second partition line CLb at an appropriate position within the captured image, so that a likelihood of detection can be increased while time to detect the second partition line CLb can be shortened.

In the parking assist apparatus 36, the second partition line CLb is detected in the second search area SEA, which is smaller than the first search area FEA. The parking assist apparatus 36 thus can even further shorten time to detect the second partition line CLb.

In the parking assist apparatus 36, it is determined whether to adopt the first partition line CLa on the basis of parallelism between the boundaries BDa1 and BDa2 of the first partition line CLa and the first parallel threshold. This can prevent a street gutter or the like other than the first partition line CLa from being mistakenly recognized as a partition line.

In the parking assist apparatus 36, it is determined whether to adopt the second partition line CLb on the basis of parallelism between the boundaries BDb1 and BDb2 of the second partition line CLb and the second parallel threshold. This prevents a street gutter or the like other than the second partition line CLb from being mistakenly recognized as a partition line. Additionally, the second parallel threshold may be set to be greater than the first parallel threshold. This can prevent a correctly detected second partition line CLb from being mistakenly discarded.

In the parking assist apparatus 36, the first partition line CLa is detected through a search of the first search area FEA in the traveling direction of the vehicle 10 and the second partition line CLb is detected through a search of the second search area SEA in a direction opposite to the traveling direction of the vehicle 10. This enables the parking assist apparatus 36 to detect the outer boundaries BDa1 and BDb1 of the pair of partition lines CLa and CLb required for the setting of the candidate parking space even more accurately.

The functions, connections, quantities, dispositions, and the like of the configurations described above may be changed or deleted as appropriate within the scope of the invention and in the scope of the invention recited in the accompanying claims and their equivalents. Some embodiments may be combined with another as appropriate. The sequence of steps in the embodiment may even be changed as appropriate.

At Steps S110 and S122 in the above embodiment, it is determined whether to adopt the detected partition lines CLa and CLb on the basis of the parallelism between the respective boundaries and the respective parallel thresholds. These steps may nonetheless be omitted.

While, in the above embodiment, it is determined at Step S112 whether the pair of partition lines CLa and CLb exists after the first partition line CLa has been detected, this step may be omitted. In this case, the detecting unit 56 may determine that the second partition line CLb does not exist when, in the search of the second search area SEA for the second partition line CLb at Step S118, the greatest minus point and plus point are smaller than a predetermined determination threshold.

The above embodiment assumes a condition in which the vehicle 10 moves forward. The above embodiment may nonetheless be applied in a condition in which the vehicle 10 moves backward.

The invention claimed is:

1. A parking assist apparatus, comprising:
a processor comprising hardware, wherein the processor is configured to:
set, within a captured image in which objects surrounding a moving vehicle have been imaged, a first search area for searching for a pair of partition lines disposed between parking spaces that are adjacent to each other;
search the first search area to detect a first partition line out of the pair of partition lines; and
set, when the first partition line is detected, a second search area for searching for a second partition line out of the pair of partition lines on the basis of the first partition line.

2. The parking assist apparatus according to claim 1, wherein the processor is further configured to set the second search area smaller than the first search area.

3. The parking assist apparatus according to claim 1, wherein the processor is further configured to determine whether to adopt the first partition line on the basis of parallelism between boundaries on both sides of the first partition line and a predetermined first parallel threshold.

4. The parking assist apparatus according to claim 3, wherein the processor is further configured to determine whether to adopt the second partition line on the basis of parallelism between boundaries on both sides of the second partition line and a second parallel threshold that is greater than the predetermined first parallel threshold.

5. The parking assist apparatus according to claim 1, wherein the processor is further configured to search the first search area for the first partition line in a traveling direction of the vehicle, and search the second search area for the second partition line in a direction opposite to the traveling direction of the vehicle.

* * * * *